(12) United States Patent
Dick et al.

(10) Patent No.: US 8,382,907 B2
(45) Date of Patent: *Feb. 26, 2013

(54) SYSTEM AND METHOD FOR CLEANING A GRINDING MACHINE

(75) Inventors: Joshua Dick, New York, NY (US); Jason Dick, New York, NY (US); William Coulter, III, Carle Place, NY (US)

(73) Assignee: Urnex Brands, Inc., Elmsford, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/420,577

(22) Filed: Mar. 14, 2012

(65) Prior Publication Data

US 2012/0260941 A1    Oct. 18, 2012

Related U.S. Application Data

(63) Continuation of application No. 10/597,746, filed as application No. PCT/US2005/012636 on Apr. 13, 2005, now Pat. No. 8,216,385.

(60) Provisional application No. 60/601,751, filed on Aug. 14, 2004, provisional application No. 60/562,868, filed on Apr. 16, 2004.

(51) Int. Cl.
*B08B 7/00* (2006.01)
*A47J 17/18* (2006.01)

(52) U.S. Cl. .............................. 134/6; 134/42; 241/167

(58) Field of Classification Search .................. None
See application file for complete search history.

(56) References Cited

U.S. PATENT DOCUMENTS 5,865,383 A * 2/1999 Ford et al. ....................... 241/36

OTHER PUBLICATIONS

Levin, Tea and Coffee Trade Journal, p. 17.*
McGraw, Mrs. Fixit, 2001, Pocket Books, p. 23.*

* cited by examiner

*Primary Examiner* — Michael Kornakov
*Assistant Examiner* — Nicole Blan
(74) *Attorney, Agent, or Firm* — Romi Bose

(57) ABSTRACT

A grinding machine cleaning system and method provides a range of human safe products that can easily be introduced into the grinding chamber and cycled through the equipment. Some of the products include corn cobs, walnut shells, pecan shells, nuts, rice, dried corn kernels, corn meal, barley, wheat, bulgur, and other grain, fiber, legume, nut, bark, and shell products in varying shapes and sizes. Organic products have largely been considered ideal. However, inorganic materials also may be used with equal effect.

9 Claims, 3 Drawing Sheets

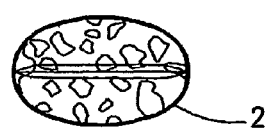
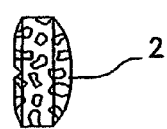
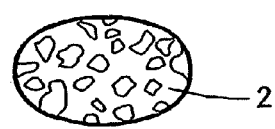
FIG. 1a  FIG. 1b  FIG. 1c
FIG. 1d
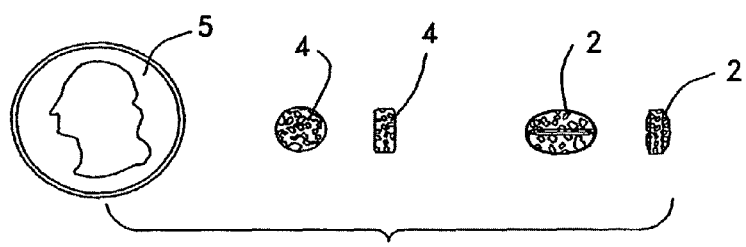
FIG. 2
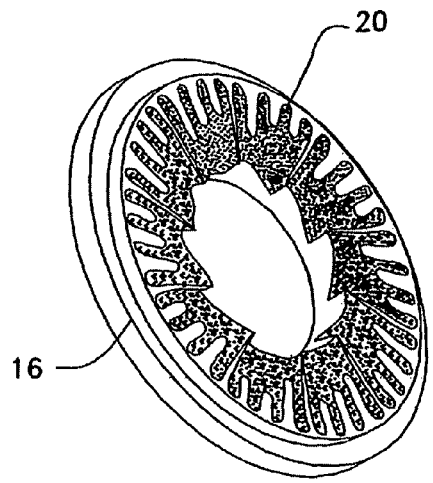
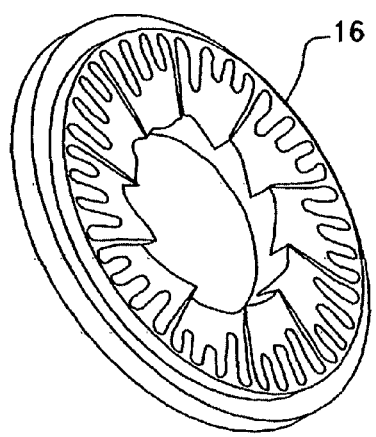
FIG. 5  FIG. 6

SYSTEM AND METHOD FOR CLEANING A GRINDING MACHINE

CROSS-REFERENCE TO RELATED APPLICATIONS

This application is a continuation of U.S. patent application Ser. No. 10/597,746, filed Aug. 5, 2006, now U.S. Pat. No. 8,216,385, which is a national stage entry of International Application No. PCT/US2005/012636, filed Apr. 13, 2005, which claims the benefit of U.S. Provisional Application No. 60/601,751, filed Aug. 14, 2004, and U.S. Provisional Application No. 60/562,868, filed Apr. 16, 2004.

FIELD OF THE INVENTION

This invention relates generally to a grinder cleaning method and apparatus and, more particularly, to a method, formulation, and procedure for cleaning home or commercial grinders by removing accumulated particles and oil residue on grinding discs.

BACKGROUND OF THE INVENTION

Grinding machines have been used for well over a hundred years to grind various types of beans, grains, rice and other materials. In modern times, the unprecedented popularity of high quality fresh coffee, for example, has resulted in a sales explosion of grinding machines for use both in commercial and home settings.

The optimal preparation of coffee is dependent on bean quality, roast execution, grind consistency, product freshness, and equipment cleanliness. After harvest and drying, whole coffee beans are roasted. Roasting serves to draw out the beans' essential oils in preparation for the brewing process. After roasting, and just prior to brewing, the beans are ground. Grinding increases the coffee bean surface area available for the extraction of coffee oils during brewing.

It is generally agreed that the optimal taste profile of coffee is achieved when the time between grinding and brewing is the shortest possible. It is also accepted that the taste of the highest quality coffee beans can easily be contaminated. The most common cause of contamination is the co-mingling of fresh beans with rancid coffee oil and particulate residue left behind from previous preparations.

In an effort to minimize the time between grinding and brewing coffee, there are coffee bean grinders in place in the vast majority of supermarkets, grocery stores, restaurants, and coffee retailers around the world. Many households also own grinding appliances to further reduce the time between grinding and brewing.

The coffee industry follows a rigorous procedure of cleaning coffee brewing equipment to insure the removal of coffee oil residue from servers, faucets, urns, decanters, filter baskets, screens, porta-filters, and even whole bean containers. These cleaning procedures are based on an effort to reduce the chance of contamination of fresh beans or brewed coffee with rancid oil residue and old bean particles. Procedures and products exist for cleaning brewing equipment of all varieties. However, there is no standard method, procedure, or product for easily removing coffee oil residue or particles from grinding equipment without time consuming disassembly of the grinding equipment and manual wiping and brushing of the grinder discs and other parts Since grinding is the first step in the brewing procedure, it is also the first opportunity for accumulated coffee oil residue (which has possibly turned rancid) to contaminate freshly ground beans. Each time a bean is ground, there is an opportunity for it to contact the grinder burrs or blades. These components may often be coated with coffee residue such as oil and very fine coffee particulate.

Aside from the possible contamination of freshly ground beans by the oily residue of previously ground beans, there is also a grinder cleaning issue surrounding "flavored coffees." Flavored coffees are roasted coffee beans that have been commercially infused with essential oils and flavorings. This is done to enhance their taste and aroma. Some popular flavored coffees include hazelnut, amaretto, vanilla, and blueberry.

The brewing preparation methods for flavored coffee are identical to those of non-flavored coffees. This includes the need to grind the beans before extraction of essential oils from the coffee—both natural and added oils. While it has already been established that the oils of natural coffee beans accumulate in grinders, it should be noted that the added oils of flavored coffees also may accumulate in grinders.

One issue that arises with the accumulation of flavorings in grinders is co-mingling. This occurs when residue from one flavor variety is ground after another in the same grinder or when natural coffee is ground in the same grinder as flavored coffee. For this reason, most retailers dedicate one grinder for all flavored coffees and a second for non-flavored coffees. Although this removes the chance of flavoring un-flavored beans, it does not eliminate cross contamination of two or more different flavor types. Furthermore, there is also the chance of an accidental use of flavored coffee in the grinder dedicated for regular roasts. When this occurs, the dedicated "non-flavor" grinder must be disassembled and cleaned to remove the flavoring residue. This is a costly procedure, often requiring a service technician's visit.

In addition to the problems of cross-contaminated flavorings, the added oils in flavored coffee have a tendency to "gum up" grinder burrs and blades. The flavoring additives create a sticky substrate that can affect grinder effectiveness. Unfortunately, regardless of the possibly substantial mechanical effect of oily accumulation on grinders, the accumulated oils are certain to infuse and contaminate all subsequent batches of coffee.

It should also be noted that there are issues of contamination related to decaffeinated coffee being ground in a machine regularly used for caffeinated coffee. If a grinder is not properly cleaned between different types of coffees, there is a chance for contamination. In some people, there is a health risk related to drinking caffeinated coffee and even the slightest residue could cause a problem.

At present, there are only two known techniques for purging oil and particle accumulation in coffee grinding equipment. Due to the fact that most commercial and home grinding burrs are made of either steel or ceramic and held in tight spaces near electrical motors, water or other liquids cannot be introduced into the grinding chamber. Adding liquid could either rust the steel burrs or damage electrical circuitry. As a result, both presently known procedures have major challenges.

Most grinder manufacturers and sellers recommend periodic disassembly of grinders and brushing of burr teeth and wheels with a soft bristle. While effective at removing particle residue, this technique is both time consuming and complicated. In addition, the process of brushing does nothing to absorb or remove oil residue.

A second, much less frequently discussed, grinder cleaning technique is the delivery of common uncooked rice into the grinding chamber. Although this technique provides the possibility of a quick and easy approach to trying to purge the burrs of coffee residue, the starchy nature of rice, the inaccurate portioning guidelines, and the gummy residue of rice do not provide a reliable solution.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. An embodiment of the invention is now described, by way of example only, with reference to the accompanying drawings in which:

FIG. 1a shows a top view of an exemplary embodiment of the cleaner shaped like a coffee bean;

FIG. 1b shows a first side view of the coffee bean shaped cleaner of FIG. 1a;

FIG. 1c shows a bottom view of the coffee bean shaped cleaner of FIG. 1a;

FIG. 1d shows a second side view of the coffee bean shaped cleaner of FIG. 1a;

FIG. 2 shows an exemplary embodiment of the cleaner in various tabletized forms;

FIG. 5 is an isometric view of a soiled burr located inside the coffee grinding machine of FIG. 1;

FIG. 6 is an isometric view of the burr of FIG. 2 after being cleaned in accordance with the present invention;

DETAILED DESCRIPTION

Figure 3:
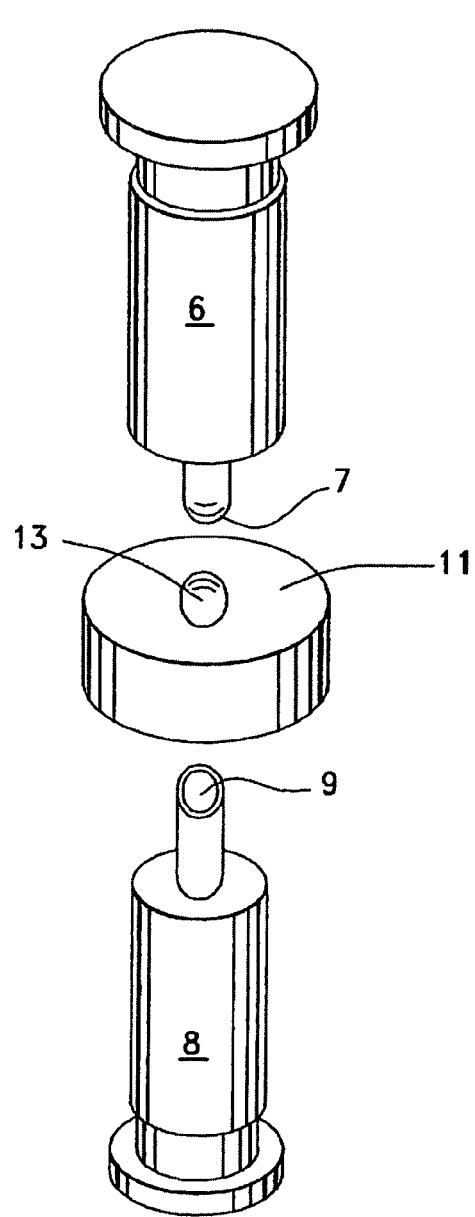
FIG. 3 illustrates a tablet mold used in pressing the cleaner into the coffee bean form of FIGS. 1a-1d.

Recognizing the need for a technique, method, and product for cleaning grinders, there is provided a range of human safe products that can easily be introduced into the grinding chamber and cycled through the equipment. In particular, portioning of an appropriate amount of particles in a carefully defined formula mix for grinding through a machine is provided. Some of the particles include, but are not limited to, corn cobs, walnut shells, pecan shells, nuts, rice, dried corn kernels, corn meal, barley, wheat, bulgur, and other grain, fiber, legume, nut, bark, and shell products in varying shapes and sizes. One key foundation of the products being tested is a desire to avoid contamination of coffee taste and the need for food safety. For this reason, organic products have largely been considered ideal. However, inorganic materials also may be used equally effectively.

It is to be noted that other key factors to be kept in mind during the selection of cleaning materials relates to the hardness, dustiness, and starch presence of any additional ingredients being considered. Certain ingredients may be too soft, causing the grinder discs and motor to lock-up, while others may be too hard, causing potential damage to the delicate burrs.

A particular advantage of the present system and method is that by delivering a secondary product into enclosed grinding chambers of a grinder to remove oil and particulate residue, the need for more regular disassembly of grinder mechanisms for cleaning is eliminated. In addition, the method offers the first means of cleaning several types of grinding mechanisms that are currently fully enclosed (such as those in vending and superautomatic espresso machines). Also, the present cleaning method and system allows for de-contamination of dedicated non-flavored grinders when accidental addition of flavored coffees has occurred. This type of contamination generally has a detrimental effect on the flavor of the coffee for several cycles until the contaminant eventually "washes" away. The cleaning method and system described herein significantly reduces or eliminates the effects of the contaminant using only one or two cleaning cycles.

Advantageously, as the cleaning material is pushed out of the grinding machine, it causes the remaining coffee or other particulates to be forced out ahead of it. This is because the cleaning material has abrasiveness, and when ground, fineness that causes pressure to build-up at the point of exit. As a result, the accumulated coffee particulates are forced out, resulting in a substantially cleaner grinding machine.

For both aesthetic and functional purposes, the color of the cleaning product, whether in tablet form or loose, may be altered or adjusted. Since the general color of the cleaning products being used is much lighter than coffee, there may be potential concern regarding visual contamination of newly ground coffee with cleaning composition. Accordingly, several food-safe dyes and colorings may be used to give the final product a uniform, coffee/caramel color. This coloration reduces operator concern about lingering residue and reduces the time required to purge the grinder chamber of all remaining cleaning compound. Conversely, a tablet of a color dissimilar from the item regularly passed through the grinder allows consumers to visually evaluate the cleaning and point of purge, since the user is able to see the residue of the grinder cleaning product.

FIG. 1 illustrates a first exemplary embodiment of the grinder cleaner wherein the cleaning materials are provided as an all-natural and food safe compound of coffee bean shaped tablets 2. Although the cleaning materials work very well in their particulate form, this type of tablet tooling offers consumers a visual cue as to the purpose of the product by its similarity to a coffee bean. Advantageously, operators can quickly and safely grind the product through their grinders to remove coffee oil and particle residue while also removing flavored coffee odors. Thus there is no longer a need to disassemble the grinder to clean burrs or casings.

There are also other distinct advantages to tabletizing the cleaning material. For example, a particular advantage of tabletizing the materials into the shape of a coffee bean is that the cleaner may be introduced into the coffee machine in a uniform unit dose. Therefore, the change of product form from a powdery, but nonetheless very effective, mixture to tablets or pellets simplifies dosing. That is, when the cleanser is provided in a tabletized or pellet form, a multitude of dosing options becomes available.

It is possible to recommend dosage based on the weight of the cleaning product, much in the same way as coffee is weighed before grinding. This results in significantly easier and more convenient operation. Furthermore, dosage recommendations may be based on a number of tablets proportionate to the type of grinder being used (e.g. 10 tablets for an espresso grinder, 20 tablets for a commercial "shop" grinder, etc.). Dosage based on volume is possible as well.

It is to be understood that dosing of the product directly affects the process of purging the grinder. Therefore, to ensure that the cleaning materials do not impact the taste of the coffee, the amount of grinder cleaning product used may be calibrated to each grinder's exit channel, which is where the last bit of ground coffee is held within the grinder. This helps make certain that optimal and consistent results are always obtained.

Another advantage in tabletizing the cleaning material is that mimicking the size and shape of a standard coffee bean results in a product that generally fits inside the entry chamber of most coffee grinders without getting stuck at the point of entry. This assures the easy and smooth delivery of the cleaning product into the grinder (all of which are made to accommodate coffee beans).

As such, tabletization helps protect the product and eases its transport. The tabletization process also allows for additional hardness to be created in the product. Further, tabletization also permits the manufacturer to control the dustiness of the final product. Since dust is a residue of the grinding process, the ability to reduce and control this is a major advantage of the tabletized product.

Depending on the type of grinding equipment, tablets of different sizes and shapes also work very well. Although the tablets 4 shown in FIG. 2 are of an exemplary size relative to that of a quarter 5, they may be any size or shape as required for a particular coffee machine. For example, oblong tablets with a width of about 8 mm and a length of about 11.5 mm and varying thickness may be used with outstanding results.

To form the cleaning materials into tablets a commercially available tablet making machine may be used (not shown). The cleaning materials are placed into tablet making machine molds and bound by pressure and any of a number of commercially available binding additives. Tablet press machines offer the ability to vary pressure significantly. This ability to control pressure and adjust for the application is valuable.

As shown in FIGS. 3, 7a-7b and 8a-8b the tablet press machine includes a first stamp 6 or punch having an integral mold in the shape of the bottom 7 of a coffee bean, a second stamp 8 having an integral mold in the shape of the top 9 of a coffee bean and a center piece 11 having an aperture 13 for receiving the ends of the molds 6, 8. Both of the stamps 6, 8 are placed in a tablet press machine (not shown) and the cleaning material is placed inside the stamps 6, 8. Next, the two punches 6, 8 are pushed together for a predetermined adjustable time at a predetermined adjustable pressure. When the molds 6, 8 are separated, the now coffee bean shaped tabletized cleaner is removed from the mold.

The binding additives may include, among others, any or all of the following: alcohol, glycerin, food and human safe pharmaceutical binders, propylene glycol, herbal extracts, sorbitol, and other similar, food safe tablet making ingredients. The pressure and form of the tablet have a great deal to do with product stability.

As described above, many different organic or inorganic materials may be used for cleaning the grinding equipment. By way of example only, the formulation may include more or less than 50% corn meal of varying size particles and a balance of one to two other ingredients as well as binding agents if necessary. Another exemplary formulation also may include a mixture of corn meal, bulgur wheat, oatmeal and quick oats, grits and rice hulls. It is to be noted, however, that the formulation may vary based on the type of machine and particular cleaning requirements of the particular machine.

In operation, portion packages, tabletized output, or bulk pails of a mixture of some of the above noted ingredients in carefully managed formulation is provided for pouring into a grinding machine. Based on the fact that the average amount of coffee used to brew the standard pot is 70 g to 100 g, and the average amount of coffee used for a single espresso is 7 g to 14 g, between 25 g and 100 g of product may be required to clean the grinding machine. The process may have to be repeated several times to ensure that the grinder is adequately cleaned. Note that more or less product may be used as required based on the type of machine and the amount of residue and/or oil on the burrs.

Figure 4:
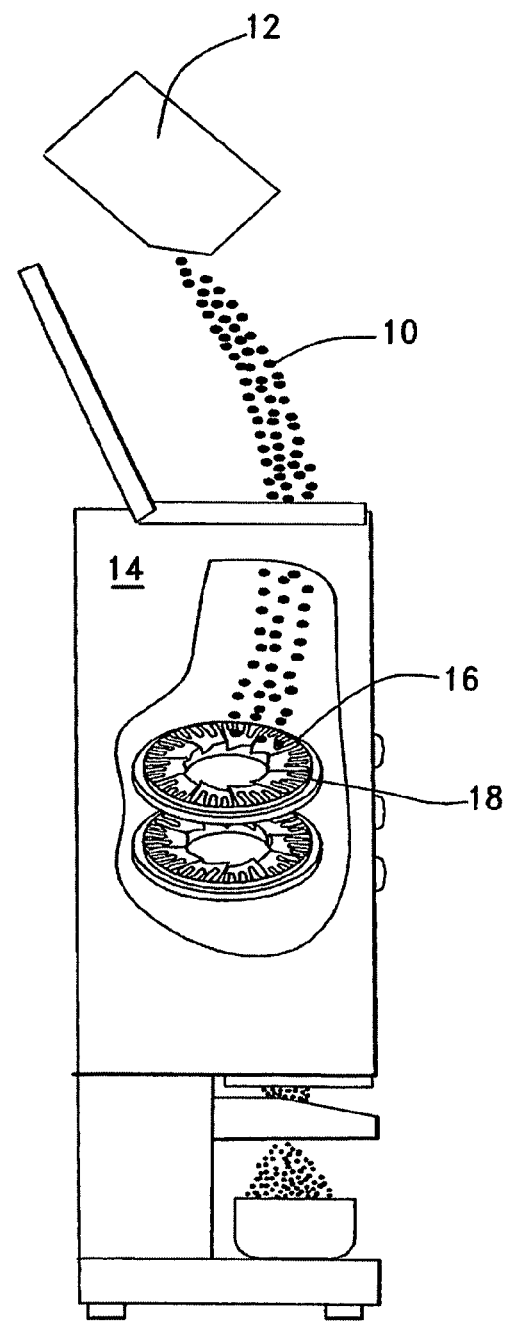
FIG. 4 is a side view of a coffee grinding machine into which a cleaner is being poured in accordance with the present invention.
Figure 7A:
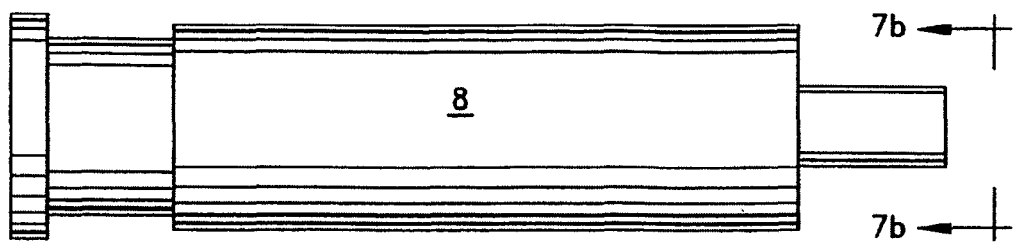
FIG. 7a is a side elevation view of a first portion of a tablet mold in accordance with the present invention.
Figure 7B:
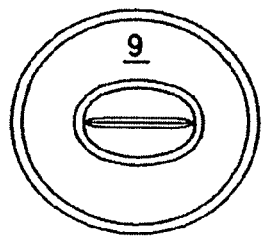
FIG. 7b is a front view of the first portion of the tablet mold of FIG. 7a taken along lines 7b.
Figure 8A:
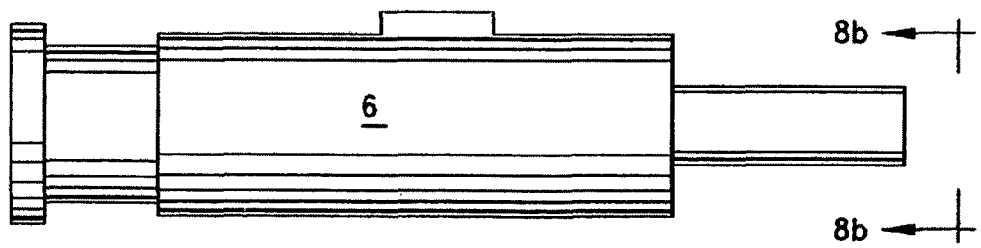
FIG. 8a is a side elevation view of a second portion of a tablet mold in accordance with the present invention.
Figure 8B:
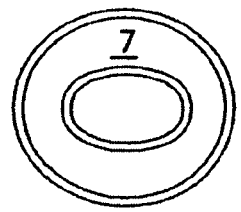
FIG. 8b is a front view of the second portion of the tablet mold of FIG. 8a taken along lines 8b.

The procedure for cleaning the grinder includes a first step of having the operator purge the coffee grinder of all whole bean coffee and ground coffee residue by running the grinder until empty. Next, as shown in FIG. 4, the cleaning material 10 is poured from a package 12, for example, into the coffee grinding machine 14, just as coffee beans would be poured in for grinding in normal operation. It should be noted that the product may be scooped, poured out of a jar, or delivered into the grinder by any delivery method. As the materials 10 move through the machine 14, they create contact with the grinding burrs 16, 18.

Next, the recommended dose of grinder cleaning materials is inserted into coffee bean hopper and the grinder is run as if grinding coffee. As the grind cycle executes, the grinder cleaning materials are passed through the grinder as if grinding coffee at medium setting. FIG. 5 shows the soiled burr 16 prior to the cleaning material formulation 10 being deposited into the grinding machine 14. As the burrs 16, 18 grind up the cleaning materials 10, the coarseness of the cleaning materials creates a friction on the burrs that causes the soil 20 from the burrs to be rubbed or knocked off.

The grinding process described above results in a significantly cleaner burr, as shown in FIG. 6. Based upon the cleaning interval of the machine, the type of coffee being ground and other factors, the cleaning step is repeated until the burrs 16, 18 are adequately cleaned. A very significant and additional advantage that has been observed is that by using the present cleaning system not only are the burrs 16, 18 thoroughly cleaned of residual materials, but so are the discs and casings (the surrounding area). These are all parts of the grinding machine that are exposed to old coffee residue and particles. The result is a grinder that is virtually free of any trace of old coffee bean grindings or whatever other materials may have been run through the grinder.

Depending on product accumulation and grinder type, different settings may be recommended and a series of on and off rest periods may be used to allow the grinder to adjust to the new substance. Optionally, a series of changes of grinding fineness insures the movement of the cleaning substance in and out of the grinding chamber. Although not necessary, such a procedure may be beneficial in increasing cleaning effectiveness.

As the cleaning materials are ground through the grinding equipment, the cleaning materials are purged as well. This is part of the standard grinding procedure as done with coffee beans for example. Purging is done by placing a recommended and defined amount of fresh coffee in the bean hopper and sending it through the grinder following the procedures mentioned above. The process may be repeated one or more times as desired and/or until the cleaning materials are purged. Finally, after the above procedure is completed, fresh whole bean coffee is returned to the hopper and normal coffee preparation resumes.

The types of grinding equipment on which the above-mentioned formulation, method, and procedure can be performed on include, but are not limited to: burr, conical burr, blade, free-standing, integrated and superautomatic espresso integrated grinders. Such grinders may be commercial/foodservice or home/domestic machines.

Although coffee machines are primarily described above in discussing the exemplary embodiments, the instant method and apparatus is easily and effectively used for cleaning various different types of grinders, such as those used in reducing the size of other particles like grains, spices, chemicals, and pharmaceuticals.

While the present system and method for cleaning a grinding machine has been described in conjunction with a specific embodiment thereof, it is evident that many alterations, modifications and variations will be apparent to those skilled in the art'in light of the foregoing description. Thus, it should be understood that the invention is not limited by the foregoing description, but embraces all such alterations, modifications and variations in accordance with the spirit and scope of the appended claims.

What is claimed is:

1. A method for cleaning a coffee grinding machine having one or more burrs soiled with oils and grinding residue, comprising:
    apportioning an amount of a cleaning material having a predetermined shape and size, wherein the cleaning material shape and size corresponds to the shape and size of materials specified to be ground by the grinder and differs from the material that caused the soiling of the burrs and wherein the amount of cleaning material apportioned is sufficient to clean the soiled burr by removing the oils and residue without impacting the flavor of any material subsequently being inserted into the grinding machine;
    inserting the cleaning material into the grinding machine;
    grinding the cleaning material using the one or more soiled burrs of the grinder, wherein during the grinding procedure the cleaning material dislodges the soil from the one or more soiled burrs; and
    purging the ground cleaning product and the soil from the grinder without the use of liquid.

2. The cleaning method of claim 1 wherein the cleaning product comprises one or more of the following materials:
    (a) legumes;
    (b) corn husks;
    (c) walnut shells;
    (d) pecan shells;
    (e) nuts;
    (f) rice;
    (g) dried corn kernels;
    (h) barley;
    (i) wheat;
    (j) grain;
    (k) fiber;
    (l) bark;
    (m) shell;
    (n) corn meal;
    (o) bulgur wheat;
    (p) oatmeal;
    (q) quick oats;
    (r) grits; and
    (s) rice hulls.

3. The cleaning method of claim 1, wherein the cleaning product is colored.

4. The cleaning method of claim 1, wherein the cleaning product is in the form of a pellet or tablet.

5. The cleaning method of claim 1, further determining a dosage amount of the apportioned cleaning product wherein the dosage amount is calibrated to the size of an exit channel of the grinding machine to prevent the cleaning product from altering the taste of the product that the grinder is intended to grind.

6. The cleaning method of claim 1, wherein the predetermined shape and size of the cleaning product varies according to the size of the grinding machine.

7. The cleaning method of claim 1, wherein the cleaning product may be of variable size, varying in one or more dimensions.

8. The cleaning method of claim 1, wherein the cleaning product is corn based.

9. The cleaning method of claim 1, wherein the cleaning product is free from all wheat and wheat based products.

* * * * *